(12) United States Patent
Weekly

(10) Patent No.: US 9,726,458 B2
(45) Date of Patent: Aug. 8, 2017

(54) THREAT-RESISTANT SHIELD

(71) Applicant: Roy L. Weekly, Naples, FL (US)

(72) Inventor: Roy L. Weekly, Naples, FL (US)

(73) Assignee: Roy Weekly, Naples, FL (US)

( * ) Notice: Subject to any disclaimer, the term of this patent is extended or adjusted under 35 U.S.C. 154(b) by 0 days.

(21) Appl. No.: 14/852,827

(22) Filed: Sep. 14, 2015

(65) Prior Publication Data
US 2016/0273883 A1    Sep. 22, 2016

Related U.S. Application Data

(60) Provisional application No. 62/134,295, filed on Mar. 17, 2015.

(51) Int. Cl.
| G08B 21/00 | (2006.01) |
|---|---|
| F41H 1/02 | (2006.01) |
| G08B 25/01 | (2006.01) |
| H04N 7/18 | (2006.01) |
| F41H 5/08 | (2006.01) |

(52) U.S. Cl.
CPC .............. *F41H 1/02* (2013.01); *F41H 5/08* (2013.01); *G08B 25/016* (2013.01); *H04N 7/183* (2013.01)

(58) Field of Classification Search
CPC .. F41H 1/02; F41H 5/08; H04N 7/183; G08B 25/016
See application file for complete search history.

(56) References Cited

U.S. PATENT DOCUMENTS

| 4,608,716 | A | 9/1986 | Brumfield | |
|---|---|---|---|---|
| 4,674,394 | A * | 6/1987 | Martino | F41H 5/08 |
| | | | | 109/49.5 |
| 6,349,201 | B1 | 2/2002 | Ford | |
| 7,609,156 | B2 | 10/2009 | Mullen | |
| 7,841,026 | B2 | 11/2010 | Makris et al. | |
| 7,891,435 | B2 * | 2/2011 | McSheffrey | A61N 1/39 |
| | | | | 116/67 R |
| 8,395,499 | B2 | 3/2013 | Mullen | |
| 8,805,431 | B2 * | 8/2014 | Vasavada | H04L 65/4061 |
| | | | | 455/404.1 |
| 2003/0198766 | A1 * | 10/2003 | Ezoe | A47C 7/26 |
| | | | | 428/36.1 |
| 2009/0301290 | A1 * | 12/2009 | Adler | F41H 5/013 |
| | | | | 89/36.07 |
| 2010/0107861 | A1 * | 5/2010 | Carter | B60N 2/60 |
| | | | | 89/36.02 |
| 2010/0117896 | A1 | 5/2010 | Chu | |

(Continued)

FOREIGN PATENT DOCUMENTS

CN    101329391 A    12/2008

*Primary Examiner* — Erin File
(74) *Attorney, Agent, or Firm* — McGinn IP Law Group, PLLC.

(57) ABSTRACT

A threat-resistant shield attached to an object, the threat-resistant shield including a main body including a cushioning material, a threat-resistant material adapted to prevent penetration therethrough that covers a portion of the main body, a transmitter disposed in the main body portion, and an external trigger mechanism that is electrically connected to the transmitter, the external trigger mechanism being fastened to the object such that detaching the threat-resistant shield from the object causes the external trigger mechanism to trigger the transmitter to transmit a signal to a remote server.

12 Claims, 4 Drawing Sheets

(56) References Cited

U.S. PATENT DOCUMENTS

| | | | | |
|---|---|---|---|---|
| 2011/0097021 A1* | 4/2011 | Curran | ............... | A45C 3/001 |
| | | | | 383/109 |
| 2011/0231985 A1* | 9/2011 | Bishop | ............... | A41D 13/05 |
| | | | | 2/456 |
| 2011/0251802 A1 | 10/2011 | Song | | |
| 2012/0079309 A1* | 3/2012 | Gaudin | ............... | G01D 4/004 |
| | | | | 713/340 |
| 2012/0247313 A1* | 10/2012 | Peters | ................. | A47C 3/04 |
| | | | | 89/36.02 |
| 2013/0205983 A1* | 8/2013 | Martin | ............... | F41H 5/013 |
| | | | | 89/36.07 |
| 2015/0254952 A1* | 9/2015 | Chao | ................. | G08B 17/10 |
| | | | | 348/158 |

\* cited by examiner

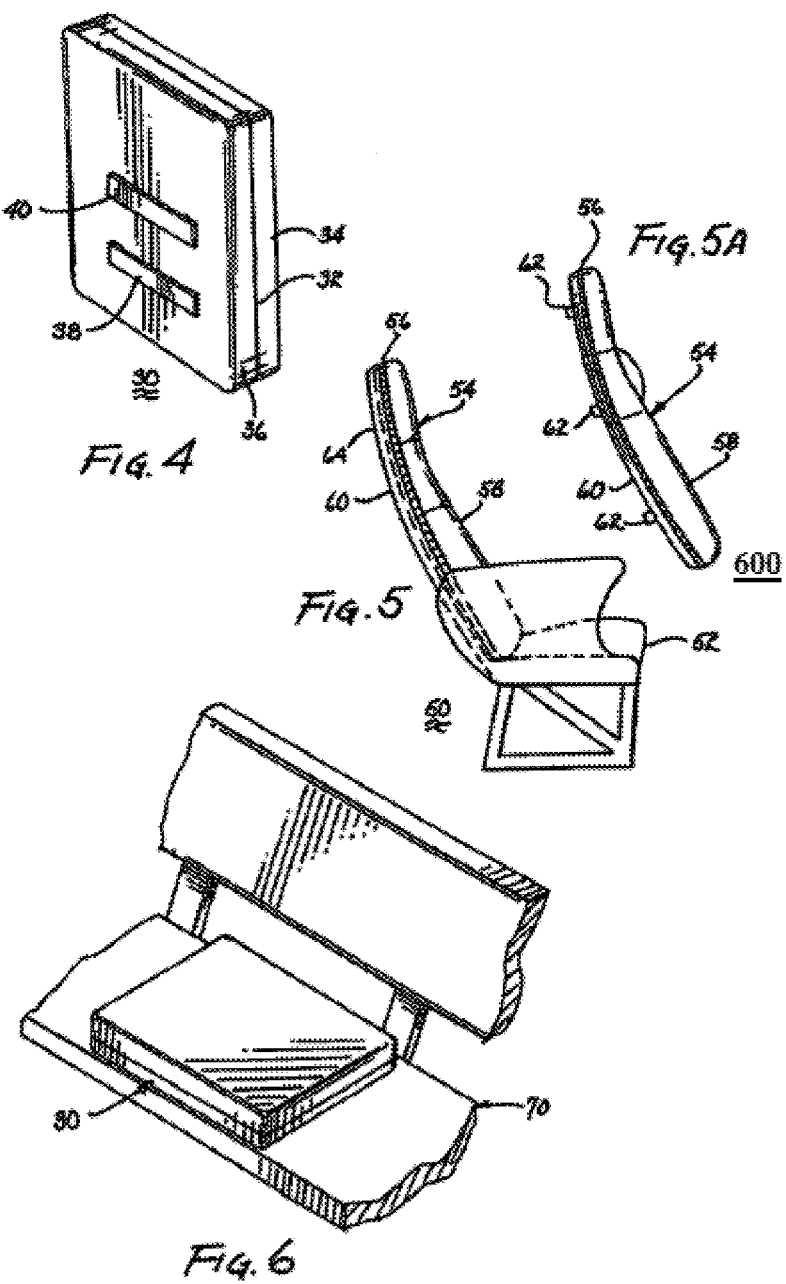

US 9,726,458 B2

THREAT-RESISTANT SHIELD

This application claims priority from U.S. Provisional Application No. 62/134,295, entitled THREAT-RESISTANT SHIELD, which was filed on Mar. 17, 2015, and is related to U.S. Pat. No. 6,688,554, the entire contents of which are incorporated herein by reference.

BACKGROUND OF THE INVENTION

The present invention relates to portable body protective devices and, more particularly, to a seat or back cushion usable to shield a user against injury from gunfire or an attacker having a sharp-edged or sharp-pointed weapon in a public (or private) gathering place, including a sensor and transmitter configured to send a signal to a remote server.

During medieval times, chain mail was worn to minimize injuries from flying arrows, and lances and during hand-to-hand combat. Garments of such chain mail were relatively effective, but very heavy and tended to limit the agility and movement by a user. Similarly, rigid contoured plates were worn for the same purposes and had the same drawbacks. For the most part, these personal protective devices are not effective to prevent injury from gunfire due to the speed and size of projectiles discharged from presently available firearms.

As technology developed, particularly in the field of man-made fibers, lighter weight materials are now available that offer significant resistance against penetration by projectiles discharged from currently available hand-held guns. Furthermore, these materials are essentially impenetrable to sharp-edged instruments, such as knives of various sorts, bayonets, icepicks, scissors, etc., any of which could otherwise inflict a painful, debilitating or fatal injury. Consequently, military and law enforcement personnel have used rigid, semi-rigid or flexible body armor made of some or all of these materials for years to protect themselves against injury from gunfire or a weapon wielding attacker. Materials of the type described above are sold by Dupont under the trademark Kevlar®, by Allied Signal under the trademark Spectra®, by Akzo Nobel under the trademark Twaron® and by Toyobo under the trademark Dyneema®. Collectively, these materials will be referred hereinafter as "threat-resistant materials". Flexible metallic materials as well as various polymers would also be within this group of threat-resistant materials.

Since there has been a recent increase in school violence such as school shootings, stabbings, or violent incidents in public gathering place, there has been a desire for an affordable protection device to provide for every person in the public gathering place. More specifically, for the school environment, there is a need for every student at a school to have a personal protection device immediately available to them. Moreover, there is a clear deficiency in the current protocol related to responding to a school shooting situation by government authority.

An Associated Press® analysis found that since the 2013 Sandy Hook, N.J. killings, increased security measures at school across the country have not reduced the number of school shootings. There have been 74 shootings since the Newtown, Conn. incident. There have been 387 school shootings since 1992.

Further, a recent Federal Bureau of Investigation study revealed that the length of time from the first shot fired to the last shot fired is about six minutes. However, police response time is typically fifteen minutes or more. The delay in police response time is caused by current methods of notification. Since a gunshot is currently the main identification that an incident is occurring, this means that the incident is already well underway by the time the police are alerted and arrive. Once the first gunshot is fired, a person in a nearby but different location needs to recognize a problem is underway and telephone the proper authorities. Then, even when the authorities arrive at the scene, the location of the shooting is typically only based on hearing more shots being fired and attempting to pinpoint the location of the incident.

If students are not safe in the schools, then the quality of education in the classroom quickly becomes a moot point. When parents send their children to school every day, the school has a duty to anticipate foreseeable dangers and to take reasonable steps to protect their children from danger.

Conventionally, schools have utilized bullet-proof glass, resource officers, bullet-proof doors, and emergency procedures. However, all these conventional methods are limited in their applications.

For example, the above described conventional procedures have failed students, as revealed by recent studies. Recently, a fire alarm was activated causing students to leave the location of the current safety protocols. As the students were leaving the areas with bullet-proof glass and bullet-proof doors, the gunman was able to shoot them as they walked out of the building.

SUMMARY OF THE INVENTION

In view of the foregoing and other problems, disadvantages, and drawbacks of the aforementioned background art, an exemplary aspect of the disclosed invention provides a threat-resistant shield.

In an exemplary embodiment, the present invention can provide a threat-resistant shield attached to an object, the threat-resistant shield including a main body including a cushioning material, a threat-resistant material adapted to prevent penetration therethrough that covers a portion of the main body, a transmitter disposed in the main body portion, and an external trigger mechanism that is electrically connected to the transmitter, the external trigger mechanism being fastened to the object such that detaching the threat-resistant shield from the object causes the external trigger mechanism to trigger the transmitter to transmit a signal to a remote server.

Further, in another exemplary embodiment, the present invention can provide a threat-resistant shield, including a main body including a cushioning material, a covering material that covers a first side of the main body, a threat-resistant material adapted to prevent penetration therethrough that covers a second side of the main body, means for carrying disposed on the first side, and a sensor disposed in the main body including a transmitter. The sensor is configured to transmit a signal via the transmitter to a remote server based on an event.

Even further, in another exemplary embodiment, the present invention can provide A threat-resistant shield, including a main body including a cushioning material, a threat-resistant material adapted to prevent penetration therethrough that covers a portion of the main body, a transmitter disposed in the main body portion, and an external trigger mechanism that is electrically connected to the transmitter, the external trigger mechanism being activated by an external event to cause the external trigger mechanism to trigger the transmitter to transmit a signal to a remote server.

Accordingly, it is an exemplary advantage of the invention to provide a threat-resistant shield that includes a sensor configured to transmit a distress signal, which can be portable so that it can be taken by students in the event that the school issues an evacuation order (bomb threat or fire alarm) that puts all students in a milling group outside the secure perimeter of school walls and locking features. The threat-resistant shield can be configured to be attached to any portion of a chair, desk, bench, wall, or any location which is easily accessible during an emergency incident.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

EFFECTS OF THE INVENTION

According to one exemplary embodiment of the invention, a technical problem of conventional safety measures can be solved by providing each student with a threat-resistant shield or the like according to the invention that is portable and can be taken by students in the event that the school issues an evacuation order (e.g., bomb threat or fire alarm) that puts all students in a milling group outside the secure perimeter of school walls and locking features. All students would then have at least a modicum of (if not extraordinarily strong) personal protection. The threat-resistant shield would be a significant advancement to student threat-resistant on school campuses.

Even further, a student being able to carry and attach the threat-resistant shield to their body would allow protection for each student in the hallways, outside, or any other location outside of the previously provided precautions in the event of a shooting.

More specifically, the threat-resistant shield can be used to protect the front and back or any body part of the body. A means for attaching to a person (i.e., straps, belt, sleeves, etc.) can be used to hold up in front or held or put on back to provide protection. The threat-resistant shield can be made to slip over the head or shoulder to provide protection for front and back. Even further, the threat-resistant shield can be configured to wrap-around the user's torso.

Moreover, the threat-resistant shield can be attached to any location easily accessible for a student or person, for example, any chair or desk or table or any combination, to which the protection material can attach to. A seat and seat back or any other portion of chair, desk, or table can also be used. The size of the threat-resistant shield can vary depending on whether it is intended for a small child, or for an adult such as a teacher who would lead the children out of danger. The threat-resistant shield can be entirely portable and configured to attach to common student items such as a backpack, laptop bag, gym bag or any item which students always typically have with them.

The threat-resistant shield provides an extra measure of protection by including a sensor and a transmitter that can serve as a tag or otherwise mark in a way to identify a location for which the shield is intended to provide protection. Thus, in this exemplary embodiment, a sensor in the attachment fitting could serve to transmit a location identification.

With the invention, a response time to an incident is decreased since a distress signal is sent to a remote server when a shield is moved and/or put in a protective position or mode. By doing so, it can send a message to a monitor which immediately alerts the proper authority that an emergency situation, such as a shooting or similar incident, is in progress. Thus, the present invention potentially reduces time wasted in waiting for an emergency call and having to locate the position of the attacker. The monitor can be a computer, iPad®, smart Phone®, smart Watch®, or any device as long as it can display a message of important to a proper response unit. The monitor could be located at a remote location covering a large area, or could be a monitor located locally to the area of coverage.

BRIEF DESCRIPTION OF THE DRAWINGS

Next, the present invention will be explained in more detail in conjunction with the attached exemplary drawings, wherein:

FIG. 4 exemplarily shows another embodiment of the threat-resistant shield shown in FIG. 2;

FIG. 5 exemplarily shows a representative removable threat-resistant shield usable with a seat, such as the type shown in FIG. 1;

FIG. 5A exemplarily shows the threat-resistant shield removed from a supporting seat shown in FIG. 5;

FIG. 6 exemplarily shows a personal portable threat-resistant shield of the type shown in FIG. 2 useable in conjunction with the seat or backrest of a park bench, stadium seat, or the like;

DETAILED DESCRIPTION OF THE EXEMPLARY EMBODIMENTS

Figure 1:
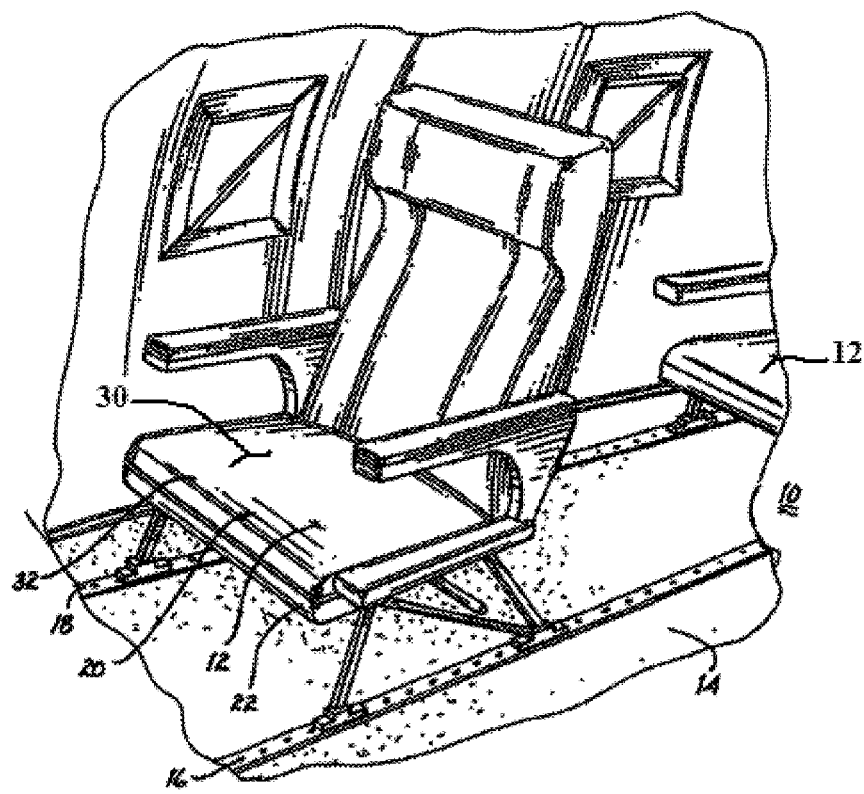
FIG. 1 exemplarily shows a representative seat mounted within the cabin of a representative commercial airliner.

The invention will now be described with reference to the drawing Figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

FIG. 1 illustrates a part of an exemplary space 10 having a plurality of seats 12 such as in an airplane cabin. Similar seats may be placed in any space 10, such as a school, university, auditorium, arena, stadium, etc. The space 10 is intended to include any located where seats can be disposed or people can congregate such that they may require protection. The exemplary seat 12 includes a conventional cushion 20 located on a seat frame 22, as intended to be used by a person.

Figure 2:
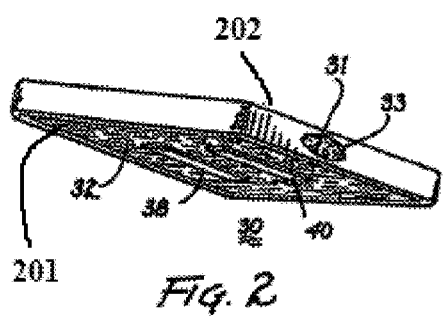
FIG. 2 exemplarily shows a threat-resistant shield useful for protecting a user against attack.
Figure 3:
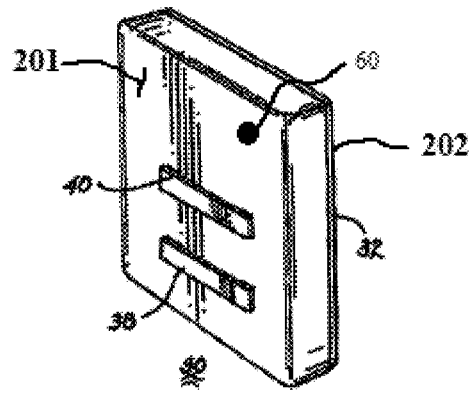
FIG. 3 exemplarily shows an embodiment of the threat-resistant shield shown in FIG. 2.

Referring jointly to FIGS. 2, 3 and 4, a threat-resistant shield 30, which can be a replacement for the conventional cushion 20 mounted upon the seat frame 22 of seat 12, will be described in further detail.

Exemplary threat-resistant shield 30 includes a cushioning material 31 disposed therein (as shown in cutaway section 33) of FIG. 2. The cushioning material 31 can be a buoyant material and/or fire-proof material, so that the shield could serve as a life vest and/or provide protection for its user in a fire.

Threat-resistant material 32 can be attached to or form a front surface 202 of cushion 30, as illustrated in FIG. 3. Alternatively, material 32 can be located on or formed as a back surface 201 of the threat-resistant shield 30, as illustrated in FIG. 2.

Even further, the entire surface area (or less preferably a portion) of the threat-resistant shield 30 can include the threat-resistant material 32 such that an entire surface area of the threat-resistant shield 30 can prevent a threat. That is, the entire exterior surface of threat-resistant shield 30 may be covered with material 32.

To prevent soiling of the threat-resistant material 32 due to normal risks of spillage, etc., the threat-resistant material 32 can be interleaved between layers 34, 36 of threat-resistant shield 30, as shown in FIG. 4.

Referring to FIGS. 2, 3, and 4, to permit a person to hold the threat-resistant shield 30 in front of a body part to be protected without exposing the person's hands or arms to injury, means for carrying 38, 40 by a person can be attached to the underside of the cushion to form loops through which the person's arm(s) or hand(s) may be placed. For example, the means for carrying may include straps, handles, buttons, knobs, the ability to slide the shield over their head and wear, etc. Thereby, manipulation of the cushion to ward off an attack is readily accomplished with minimal exposure to the person's hands/arms. The means for carrying 38, 40 is intended to cover any known structural entity that can be attached to the threat-resistant shield 30 such that a person can hold the threat-resistant shield 30 in a protective position.

Preferably, the means for carrying 38, 40 are on the back surface 201 of the cushion so that they will not interfere with normal activities when the threat-resistant shield 30 is mounted upon seat frame 22 (see FIG. 1).

It is to be understood that means for carrying 38, 40 can be mounted upon one or both opposed sides of the threat-resistant shield 30 or upon the sides of the cushion and whether or not such means for carrying 38, 40 are in addition to the means for carrying 38, 40 on either the front surface 202 or back surface 201 of the threat-resistant shield 30.

It should be noted that the combination of the interior materials of the threat-resistant shield 30 enable the threat-resistant shield 30 to be lightweight so that people of all ages can easily carry the threat-resistant shield 30.

FIG. 5 illustrates a side view of a seat 60. Seat 60 includes a conventional seat cushion 52 and a back cushion 54. Generally, the back cushion 54 is significantly larger than the seat cushion 52. As an alternative embodiment to the threat-resistant shield 30, the back cushion 60 can be removable and configured as a threat-resistant shield 600, as shown in FIG. 5A.

Because the back cushion 54 is significantly larger than seat cushion 52, a person using the back cushion as the threat-resistant shield 600 against an attack exposes less of the their body.

As illustrated, the threat-resistant material 56, of the type described above, may be interleaved between a front surface 58 and a rear surfaces 64 of the threat-resistant shield 600.

As shown with respect to the threat-resistant shield 600, the threat-resistant material 56 of the back cushion 54 can be formed as part of either the front surface 58 or the back surface 64 of the back cushion 54.

Means for carrying 62 the threat-resistant shield 600 to protect body parts of the user are be attached to the back surface 64. The means for carrying 62 include all the listed features of the means for carrying 38, 40. That is to say, the means for carrying 60 is intended to cover any known structural entity that can be attached to the threat-resistant shield 600 such that a person can hold the threat-resistant shield 600.

It is to be understood that the back cushion 54 is supported by a frame or a shell or the like fat ring a part of seat 50.

As discussed above, people have been attacked in various vehicles used for public transportation, such as buses, trains, trams, boats etc. These attacks have usually resulted in injury and sometimes in a fatality. To provide a person with, not only a comfortable seat, but also the threat-resistant shield 30, 600 in an attempt to protect the person against an attack, the threat-resistant shield 30, 600 described above can be portable and used in conjunction with travel in a public transport vehicle.

The threat-resistant shield 30 resting upon a representative seat 70 is illustrated in FIG. 6. It is to be understood that seat 70 may be a conventional bench seat or individual seat located in a public transport vehicle. The embodiment of the threat-resistant shield 30 shown in FIG. 6 is equivalent to that shown in FIG. 4, but could be any of the embodiments shown in FIG. 1, 2 or 3.

The threat-resistant shield 30 can also be an object carried by an individual, serve as, for example, a cushion to sit on, or could be fabricated to serve a purpose such as a tote bag, gym bag, backpack draped over the user's shoulders and used to carry objects. That is, the threat-resistant shield 30 can be entirely portable and sold separately from the seat. The individual can bring the threat-resistant shield 30 with them everywhere they travel.

FIGS. 7-10 depict a person 800 in a classroom. In the background is a blackboard showing mathematical equations to depict a typical classroom setting.

Figure 7:
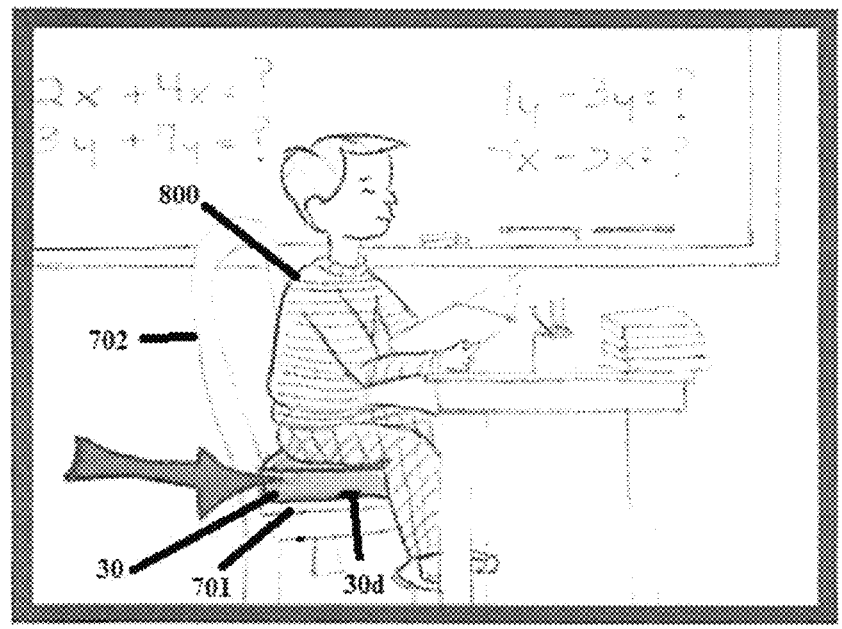
FIG. 7 exemplarily shows another embodiment of the threat-resistant shield attached to a seat with a student sitting on it.

In an exemplary embodiment, as illustrated in FIG. 7, the threat-resistant shield 30 can be attached to a seat 701 of a chair 702 in a classroom 700, or any public gathering place. The threat-resistant shield 30 is securely attached to the seat 701 such that accidental detachment does not occur.

Figure 8:
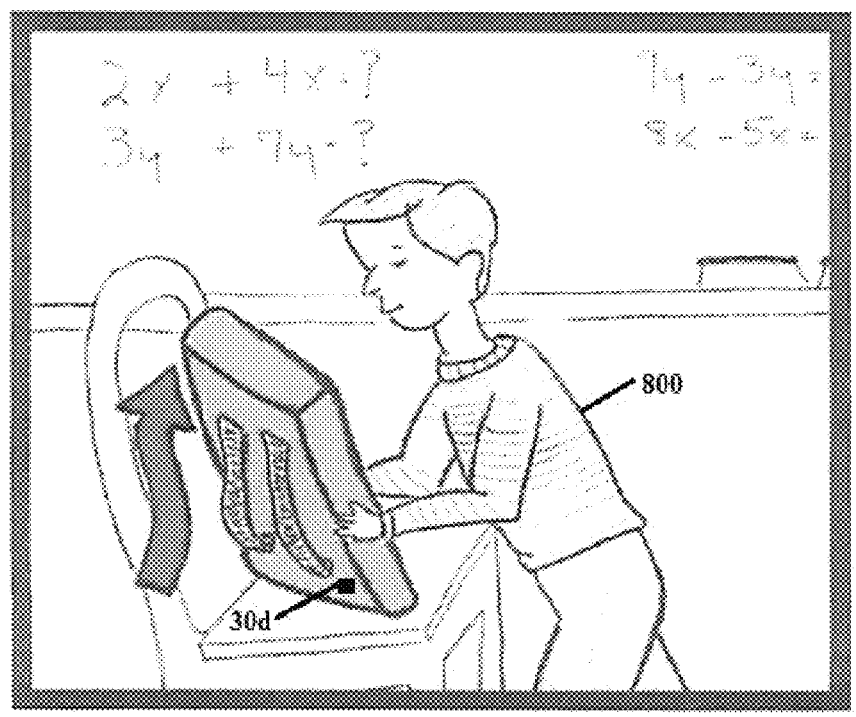
FIG. 8 exemplarily shows a student removing the threat-resistant shield from the seat.
Figure 9:
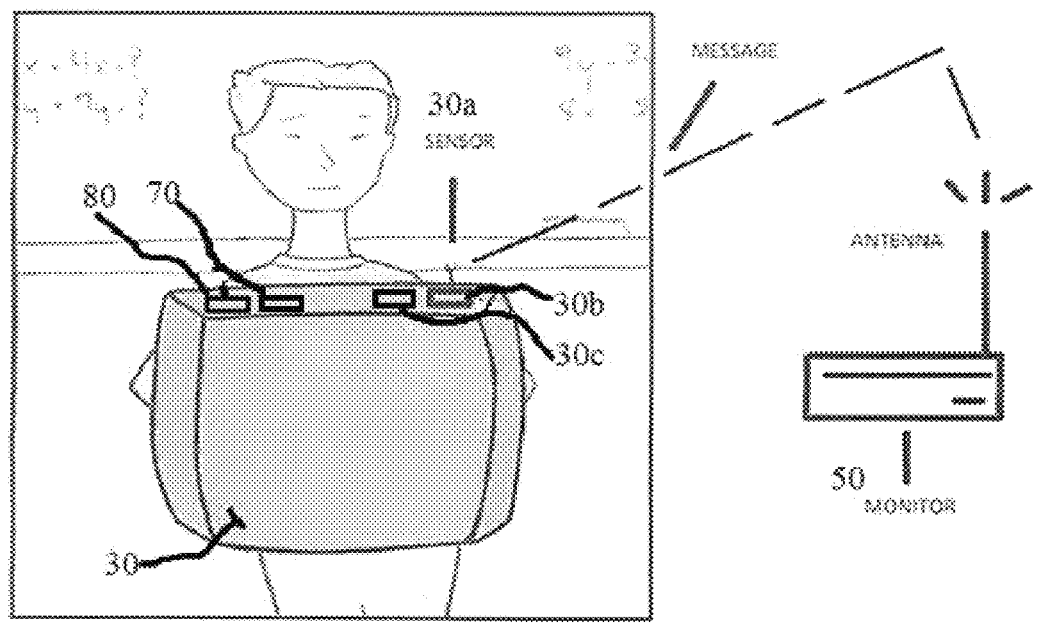
FIG. 9 exemplarily shows the student attaching the threat-resistant shield to his body.
Figure 10:
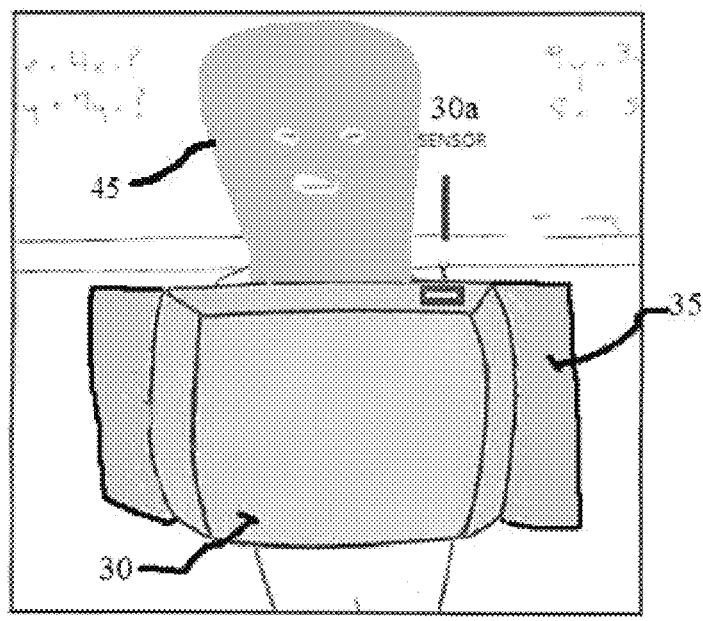
FIG. 10 exemplarily shows a third embodiment of the threat-resistant shield.

FIGS. 8 and 9 exemplarily show a person 800 detaching the threat-resistant shield 30 from the seat 701 and placing the threat-resistant shield 30 in a protective position (i.e., the protective position is exemplarily shown in FIG. 9).

Further, the threat-resistant shield 30 includes a sensor 30a and a transmitter 30b which are capable of transmitting a signal to a remote server or monitor 50 indicative that the threat-resistant shield 30 has been deployed in an emergency situation. The transmitter 30*b* is both powered by power regulation and filtering means connected to the device. The transmitter 30*b* further includes radio frequency (RF) generating means.

Even further, the threat-resistant shield 30 includes an external trigger mechanism 30*d* that is connected to the sensor 30*a* and the transmitter 30*b*. Triggering the external trigger mechanism 30*d* activates the RF generating means of the transmitter 30*b*, and sends data for modulation and transmission to the remote server or monitor 50.

The external trigger mechanism 30*d* can be securely fastened to the seat 701 such that detaching the threat-resistant shield 30 from the seat 701 will cause the external trigger mechanism 30*d* to activate the RF generating means of the transmitter 30*b*.

For example, the external trigger mechanism 30*d* can be configured with a simple automatic deployment circuit that closes a set of contacts if movement is detected, or if the threat-resistant shield 30 is pulled away from its attachment points, or if straps are fastened together as the user puts on the threat-resistant shield 30.

By, for example, a switch 60, the threat-resistant shield 30 could also incorporate manual activation should the threat-resistant shield 30 be used in any embodiment that does not include being attached to a seat 702 (i.e., relating generally to the threat-resistant shield 30 which is portable).

The external trigger mechanism 30*d* is electrically connected to the transmitter 30*b* such that the external trigger mechanism 30*d* is activated by an external event to cause the external trigger mechanism 30*d* to trigger the transmitter 30*b* to transmit a signal to a remote server. The external event includes any event, such as and not limited thereto, gun-fire, activating the switch 60, removing the threat-resistant shield 30 from an object, heat, etc.

The remote server or monitor 50 can be located in the school, in a police station, at a designated emergency station, etc. The remote server or monitor 50 is capable of receiving and displaying a message sent from the sensor 30*a*.

Even further, the sensor 30*a* can be configured to cause the transmitter 30*b* to send a signal when the threat-resistant shield 30 is placed in a protective position. The sensor 30*a* may include a gyroscope-type item which enables the threat-resistant shield 30 to be identified in a protective position.

Thus, when shield is detached and/or put in a protective position, the sensor 30*a* automatically triggers the transmitter 30*b* to send a message to the remote server or monitor which can be a computer, iPad®, smart Phone®, and smart Watch®, etc. The message can be anything of importance notifying of the incident.

Also, the switch 60 indicates that an incident is underway and the sensor 30*a* sends the signal to the remote server 50.

The sensor 30*a* can also include a Global Positioning System (GPS) emitter 30*c* such that the location of the threat-resistant shield 30 can be determined at any time.

The threat-resistant shield 30 may further include a camera and image processor unit 70 capable of sending a video signal to the remote server 50. The camera and image processor unit 70 may be similar to cameras currently in use by police units (i.e., body cameras). The image processor 70 can be automatically activated when a signal from the transmitter 30*b* is sent to the remote server 50. Also, the image processor 70 can be automatically activated by the external trigger mechanism 30*d* being triggered.

The threat-resistant shield 30 may further include an audio detection unit 80, such as a microphone. The audio detection unit 80 is configured of a microphone capable of sending audio during an incident to the remote server 50 via the transmitter 30*b*. The audio detection unit 80 may also include a speaker so that the threat-resistant shield 30 can transmit audio from an emergency authority, such as a crisis negotiator. In this manner, the audio detection unit 80 would further include a receiving unit therein capable of receiving audio frequencies and outputting the sound through the speaker.

Also, the audio detection unit 80 can be configured to detect a decibel level of a gunshot and trigger the transmitter 30*b* to automatically send a distress signal to the remote server 50. The audio detection unit 80 can be automatically activated by the external trigger mechanism 30*d* being triggered.

The image processor unit 70 and the audio detection unit 80 may be integrated together or provided separately.

Since the signal is sent from the threat-resistant shield 30 when an incident begins, response time by the proper authorities can be drastically improved and lives can potentially be saved more efficiently. Also, since the threat-resistant shield 30 has means for carrying 38, 40 by a person, people can easily able to attach the threat-resistant shield 30 to their body while evacuating a scene. Also, the threat-resistant shield 30 can provide protection from gunfire even when the person is evacuated out of the building.

Further, the shield can include an abort function such that if the shield is accidentally detached from the fixture, the user can abort the signal to the police. However, the abort button can only abort the signal to the police within a set time frame such that it prevents the attacker from aborting the police call. This time frame can be set by each user to whatever time frame they chose.

Second Embodiment

In a second embodiment, the threat-resistant shield 30 can be configured to be attached to a bottom of a table, a bottom of a chair, a back of a chair, a wall, or any other location where a person can access the shield in case of an emergency.

The threat-resistant shield 30 can be configured to attach to the wall of a classroom. Therefore, when there are people in a room which are not seated, they can still have access to the threat-resistant shield 30 attached to the wall.

Third Embodiment

In a third embodiment, the threat-resistant shield 30 can also include extending portions 35 which extend from the outer cover to provide further protection of the people's sides. The extending portions 35 include the threat-resistant material 32 and are flexible.

The extending portions 35 can also include protective portions such that protective, threat-resistant material could serve as a hood 45 over the user's head, including, in some exemplary embodiments, a transparent portion for face protection through which the user can still see. The hood 45 extension could also be configured to serve as a small air pocket that temporarily protects the user against toxic fumes and/or provides a small amount of breathable air to permit the user to escape a fire.

Means for carrying 38, 40 by a person can be made to slip over the head or shoulder to provide protection for front and back, (like sandwich board), or to wrap around the users torso.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

Further, Applicant's intent is to encompass the equivalents of all claim elements, and no amendment to any claim of the present application should be construed as a disclaimer of any interest in or right to an equivalent of any element or feature of the amended claim.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A threat-resistant shield attached to an object, the threat-resistant shield comprising:
    a main body including a cushioning material;
    extending sections configured to extend outwardly from a periphery of the main body;
    a threat-resistant material adapted to prevent penetration therethrough that covers a portion of the main body and that covers the extending sections;
    a transmitter disposed in said main body portion;
    an external trigger mechanism that is electrically connected to the transmitter, the external trigger mechanism being fastened to the object such that detaching the threat-resistant shield from the object causes the external trigger mechanism to trigger said transmitter to transmit a signal to a remote server;
    an image processing unit disposed in the main body and configured to send a video signal to the remote server when the external trigger mechanism is triggered;
    an audio detection unit disposed in the main body and configured to send an audio signal to the remote server when the external trigger mechanism is triggered; and
    a manual switch configured to deactivate the external trigger mechanism to cancel the signal the video signal, and the audio signal to the remote server within a redetermined time period from a time that the external trigger mechanism is triggered by the detaching from the object.

2. A threat-resistant shield, comprising:
    a main body including a cushioning material;
    a covering material that covers a first side of the main body;
    extending sections configured to extend outwardly from a periphery of the main body;
    a threat-resistant material adapted to prevent penetration therethrough that covers a second side of the main body and that covers the extending sections;
    means for carrying disposed on the first side; and
    a sensor disposed in said main body including a transmitter,
    wherein said sensor is configured to transmit a signal via said transmitter to a remote server based on an event, the threat-resistant shield further comprises:
        an external trigger mechanism that is electrically connected to the sensor,
        an image processing unit disposed in the main body and configured to send a video signal to the remote server when the external trigger mechanism is triggered;
        an audio detection unit disposed in the main body and configured to send an audio signal to the remote server; when the external trigger mechanism is triggered and
        a manual switch configured to deactivate the sensor to cancel the signal, the video signal, and the audio signal to the remote server within a predetermined time period from when the sensor is triggered to send the signal.

3. The threat-resistant shield of claim 2, wherein the threat-resistant shield is attached to an object, and
    wherein said event includes the threat-resistant shield being detached from the object.

4. The threat-resistant shield of claim 2, wherein the threat-resistant shield is attached to an object, and wherein the external trigger mechanism being attached to the object such that the event includes detaching the threat-resistant shield from the seat to cause the external trigger mechanism to trigger said transmitter to transmit a signal to the remote server.

5. The threat-resistant shield of claim 2, wherein the means for carrying includes a pair of straps configured to fit over arms of a person.

6. The threat-resistant shield of claim 2, wherein the means for carrying includes a slip-on portion to wear on shoulders of a person.

7. The threat-resistant shield of claim 2, wherein the sensor further includes a Global Positioning System® transmitter for determining a location of the threat-resistant shield.

8. The threat-resistant shield of claim 2, further including a first resistant coating which covers the first side and the second side.

9. The threat-resistant shield of claim 2, wherein the threat-resistant material is disposed to cover the covering material that covers the first side of the main body.

10. The threat-resistant shield of claim 2, wherein the threat-resistant material is disposed so as to cover an entire surface area of the threat-resistant shield.

11. The threat-resistant shield of claim 2, wherein the manual switch is further configured to activate the sensor to send the signal to the remote server.

12. A threat-resistant shield, comprising:
    a main body including a cushioning material;
    extending sections configured to extend outwardly from a periphery of the main body;
    a threat-resistant material adapted to prevent penetration therethrough that covers a portion of the main body and that covers the extending sections;
    a transmitter disposed in said main body portion;
    an external trigger mechanism that is electrically connected to the transmitter, the external trigger mechanism being activated by an external event to cause the external trigger mechanism to trigger said transmitter to transmit a signal to a remote server;
    an image processing unit disposed in the main body and configured to send a video signal to the remote server when the external trigger mechanism is triggered;
    an audio detection unit disposed in the main body and configured to send an audio signal to the remote server when the external trigger mechanism is triggered; and a manual switch configured to deactivate the external trigger mechanism to cancel the signal, the video signal, and the audio signal to the remote server within a predetermined time period from a time that the external trigger mechanism is triggered by the detaching from the object.

* * * * *